United States Patent [19]

Kunde

[11] Patent Number: 4,486,348
[45] Date of Patent: Dec. 4, 1984

[54] CATIONIC TRIAZINE AZO DYES

[75] Inventor: Klaus Kunde, Leverkusen, Fed. Rep. of Germany

[73] Assignee: Bayer Aktiengesellschaft, Leverkusen, Fed. Rep. of Germany

[21] Appl. No.: 582,997

[22] Filed: Feb. 24, 1984

Related U.S. Application Data

[63] Continuation-in-part of Ser. No. 327,642, Dec. 4, 1981, abandoned.

[30] Foreign Application Priority Data

Dec. 24, 1980 [DE] Fed. Rep. of Germany ....... 3048997

[51] Int. Cl.³ .................. C09B 44/18; D21D 3/00; D21H 3/80; D21H 3/82
[52] U.S. Cl. .................. 534/741; 162/162; 544/197; 534/612; 534/615
[58] Field of Search .................. 260/153, 146 T

[56] References Cited

U.S. PATENT DOCUMENTS

| | | | |
|---|---|---|---|
| 2,938,024 | 5/1960 | Brassel et al. | 260/153 |
| 3,252,965 | 5/1966 | Entschel et al. | 260/154 |
| 3,252,967 | 5/1966 | Entschel et al. | 260/158 |
| 3,337,523 | 8/1967 | Entschel et al. | 260/165 |
| 3,341,514 | 9/1967 | Entschel et al. | 260/165 |
| 3,346,553 | 10/1967 | Kuhne et al. | 260/163 |
| 4,273,707 | 6/1981 | Pedrazzi | 260/153 |
| 4,363,761 | 12/1982 | Pedrazzi | 260/153 |
| 4,367,172 | 1/1983 | Pedrazzi | 260/153 |

FOREIGN PATENT DOCUMENTS 2424305 11/1979 France .................. 260/153

*Primary Examiner*—Floyd D. Higel
*Attorney, Agent, or Firm*—Sprung, Horn, Kramer & Woods

[57] ABSTRACT

Cationic triazinyl dyestuffs of the formula

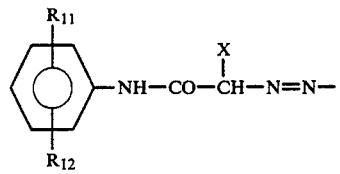

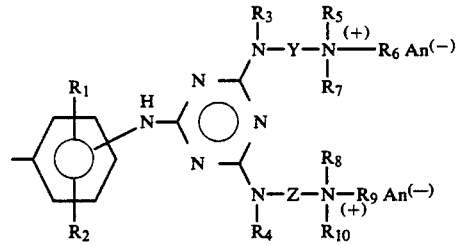

wherein $R_{11}$ and $R_{12}$ independently of one another are H, Cl, Br, $OCH_3$, $OC_2H_5$, $CH_3$ or $C_2H_5$, X is a radical of the formula $COCH_3$, CN, $COOCH_3$, $COOC_2H_5$, $CONH_2$ or $COC_6H_5$, Y and Z independently of one another are $C_2$–$C_5$-alkylene, $R_1$ and $R_2$ independently of one another are H, Cl, Br, $OCH_3$, $OC_2H_5$, $CH_3$ or $C_2H_5$, $R_3$ and $R_4$ independently of one another are hydrogen or $C_1$–$C_4$-alkyl, $R_5$–$R_{10}$ independently of one another are hydrogen, $C_1$–$C_4$-alkyl, β- or γ-hydroxy-$C_2$–$C_4$-alkyl, phenyl or benzyl, or $R_5$ and $R_6$, and/or $R_8$ and $R_9$ in each case together with the nitrogen, form a pyrrolidine, morpholine or piperidine ring, or $R_5$, $R_6$ and $R_7$ and/or $R_8$, $R_9$ and $R_{10}$, in each case together with the nitrogen, form a pyridinium or picolinium radical, and $An^{(-)}$ is an anion are especially useful for dyeing paper.

4 Claims, No Drawings

CATIONIC TRIAZINE AZO DYES

This is a continuation-in-part of application Ser. No. 327,642, filed Dec. 4, 1981, now abandoned.

The invention relates to new dyestuffs of the general formula

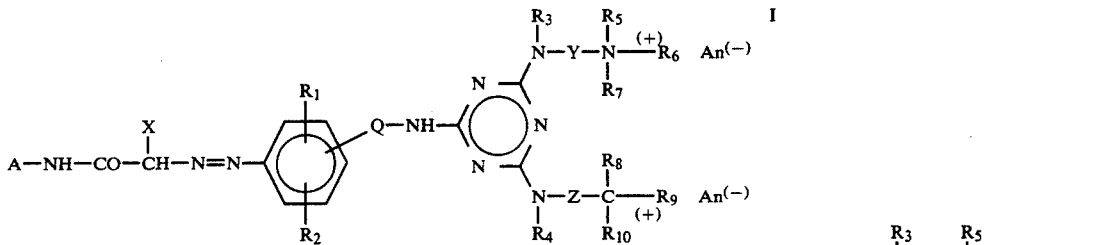

wherein

A is an aromatic or hetero-aromatic radical which is free from anionic groups,

Q is a direct bond or a bridge member,

X is a radical of the formula $COCH_3$, CN, $COOCH_3$, $COOC_2H_5$, $CONH_2$, $COC_6H_5$ or $CON(R_3)-Y-N(R_5R_6R_7)^{(+)} An^{(-)}$, Y and Z independently of one another are divalent bridge members or direct bonds, $R_1$ and $R_2$ independently of one another are hydrogen or non-ionic substituents, $R_3$ and $R_4$ independently of one another are hydrogen, $C_1$-$C_4$-alkyl or β- or γ-hydroxy-$C_2$-$C_4$-alkyl and $R_5$-$R_{10}$ independently of one another are hydrogen, $C_1$-$C_4$-alkyl, β- or γ-hydroxy-$C_2$-$C_4$-alkyl, β- or γ-ammonium-$C_2$-$C_4$-alkyl, phenyl or benzyl, or $R_5$ and $R_6$, and/or $R_8$ and $R_9$, in each case together with the nitrogen, form a five-membered or six-membered heterocyclic radical, or Y, $R_3$ and $R_5$, and/or Z, $R_4$ and $R_8$, together with the particular nitrogen atoms, form a piperazine ring, or $R_5$, $R_6$ and $R_7$, and/or $R_8$, $R_9$ and $R_{10}$, in each case together with the nitrogen, form an optionally substituted pyridinium radical, and $An^{(-)}$ is an anion, and to a process for their preparation, which is characterised in that one mol of a cyanuric halide and one mol of each of the compounds $$[H_2N(R_3)-Y-NR_5R_6R_7]^{(+)}An^{(-)} \qquad II$$

$$[H_2N(R_4)-Z-NR_8R_9R_{10}]^{(+)}An^{(-)} \qquad III$$

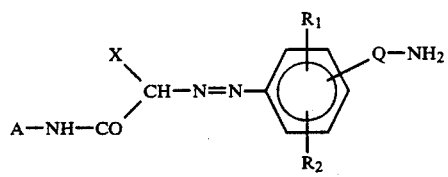

wherein A, Q, X, Y, Z, $R_1$-$R_{10}$ and $An^{(-)}$ have the above-mentioned meaning, are reacted in any desired sequence and in the customary manner, or in that one mol of an amine of the general formula

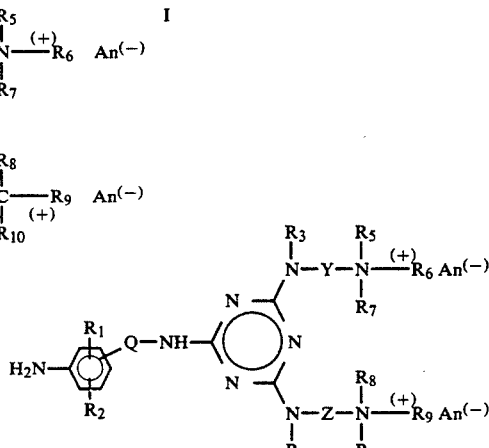

wherein Q, Y, Z, $R_1$-$R_{10}$ and $An^{(-)}$ have the abovementioned meaning, is diazotised, and the diazotisation product is coupled with one mol of a coupling component of the general formula $$X-CH_2-CO-NH-A \qquad VI$$

wherein A and X have the abovementioned meaning.

The invention also relates to the use of the dyestuffs of the formula I for dyeing synthetic and naturally occurring materials which can be dyed with cationic dyestuffs, in particular for dyeing paper.

A is, in particular, a radical of the benzene, naphthalene, thiazole, benzothiazole, benzisothiazole or thiadiazole series.

Examples which may be mentioned of the bridge member Q are the radicals

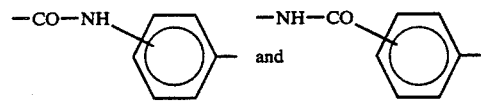

wherein the benzene ring is linked to the NH group in the formula I.

Examples of bridge members Y and Z are $C_2$-$C_5$-alkylene, $C_5$-$C_7$-oxaalkylene, phenylene and benzylene.

Examples of non-ionic substituents $R_1$ and $R_2$ which may be mentioned are halogen, in particular chlorine and bromine, and $C_1$-$C_4$-alkyl and $C_1$-$C_4$-alkoxy.

$R_5$ and $R_6$, and/or $R_8$ and $R_9$, together with the nitrogen, can form, for example, an optionally methylsubstituted pyrrolidone, morpholine or piperidine ring.

$R_5$, $R_6$ and $R_7$, and/or $R_8$, $R_9$ and $R_{10}$, together with the nitrogen, preferably form a pyridinium or picolinium radical.

Preferred dyestuffs of the formula I are those of the formula

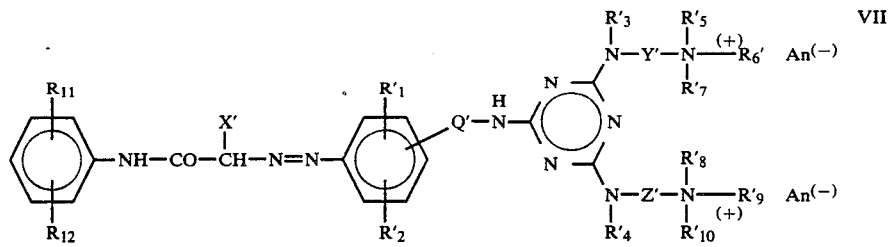

wherein $R_{11}$ and $R_{12}$ independently of one another are H, Cl, Br, $OCH_3$, $OC_2H_5$, $CH_3$ or $C_2H_5$, Q' is a direct bond or a p-$NHCOC_6H_4$ or p-$CONHC_6H_4$ radical, X' is a radical of the formula $COCH_3$, CN, $COOCH_3$, $COOC_2H_5$, $CONH_2$, $COC_6H_5$ or $CON(R'_3)$—Y—$N(R'_5R'_6R'_7)^{(+)}An^{(-)}$, Y' and Z' independently of one another are direct bonds, $C_2$–$C_5$-alkylene, $C_5$–$C_7$-oxaalkylene, phenylene or benzylene, $R'_1$ and $R'_2$ independently of one another are H, Cl, Br, $OCH_3$, $OC_2H_5$, $CH_3$ or $C_2H_5$, $R'_3$ and $R'_4$ indpendently of one another are hydrogen, $C_1$–$C_4$-alkyl or $\beta$- or $\gamma$-hydroxy-$C_2$–$C_4$-alkyl, and $R'_5$–$R'_{10}$ independently of one another are hydrogen, $C_1$–$C_4$-alkyl, $\beta$- or $\gamma$-ammonium-$C_2$–$C_4$-alkyl, $\beta$-or $\gamma$-hydroxy-$C_2$–$C_4$-alkyl, phenyl or benzyl, or $R'_5$ and $R'_6$, and/or $R'_8$ and $R'_9$, in each case together with the nitrogen, form a pyrrolidine, morpholine or piperidine ring, or $R'_5$, $R'_6$ and $R'_7$, and/or $R'_8$, $R'_9$ and $R'_{10}$, in each case together with the nitrogen, form a pyridinium or picolinium radical, and $An^{(-)}$ is an anion.

Dyestuffs of the formula VII wherein
$R_{11}$ denotes hydrogen,
$R_{12}$ is in the o-position relative to the amino group and
$R'_2$ is in the o-position relative to the azo group, are preferred.

Dyestuffs of the formula which are used as the arylide components are, for example, aniline, o-anisidine, o-toluidine, o-phenetidine, p-anisidine, p-phenetidine, p-toluidine, m-anisidine, m-toluidine, 2-methoxy-4-methylaniline, 2-methyl-4methoxyaniline, o-chloroaniline, m-chloroaniline, p-chloroaniline and 2,4-dimethylaniline.

The $\beta$-carbonylcarboxylic acid arylides which are used as coupling components are obtained, for example, by reacting the anilines with one of the following reagents in a manner which is known per se: diketene, methyl acetoacetate, ethyl acetoacetate, ethyl cyanoacetate, methyl cyanoacetate, dimethyl malonate, diethyl malonate, malonic acid monomethyl ester-amide, malonic acid monomethyl ester imino-ester or methyl benzoylacetate.

The anilines of the formula (V) are obtained, for example, by reacting nitroanilines by the method described in German Offenlegungsschrift No. 2,915,323; catalytic reduction, for example with Raney nickel or with sodiumdithionite is also a possible method of reduction. Examples of possible nitroanilines are: p-nitroaniline, m-nitroaniline, 4-nitro-3-methylaniline, 3-nitro-4-methylaniline, 4-nitro-3-methoxyaniline, 3-nitro-4-methoxyaniline, 3-nitro-4-ethoxyaniline, 4-nitro-3-chloroaniline and 4-chloro-3-nitroaniline, 5-nitro-2-methylaniline, 3-nitro-4,6-dimethylaniline.

The compounds which follow can be used, for example, as amines which can be converted into the ammonium compounds II and III by quaternisation: 2-dimethylaminoethylamine, 3-dimethylaminopropylamine, 2-(2'-dimethylaminoethoxy)-ethylamine, 3-morpholino-

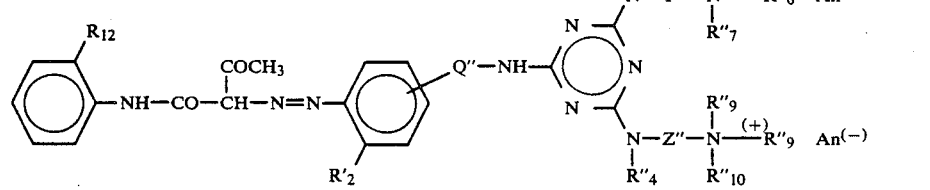

wherein

Q" is a direct bond or a p-$NHCOC_6H_4$ radical,

Y" and Z" independently of one another are $C_2$–$C_4$-alkylene, $R''_3$–$R''_{10}$ independently of one another are H, $C_1$–$C_4$-alkyl or $\beta$-hydroxy-$C_2$–$C_4$-alkyl and $R'_2$, $R_{12}$ and $An^{(-)}$ have the meaning given in the case of formula VII, are of particular value.

Compounds of the formula $$A\text{—}NH_2 \qquad \qquad IX$$

propylamine, 2-diethylaminoethylamine, 3-diethylaminopropylamine, 2-(bis-$\beta$-hydroxyethylamino)-ethylamine, 2-(bis-$\beta$-hydroxyethylamino)-propylamine, 4-dimethylaminoaniline, 3-dimethylaminoaniline, 4-aminodimethylbenzylamine, 3-aminodimethylbenzylamine, 4-aminomethylbenzylamine, 1,2-diaminoethane, 1,2-diaminopropane, 1,2-diaminobutane, 1,4-diaminobutane, 2-methylaminoethylamine, methyl-2-aminopropylamine, diethylenetriamine, bis-(3-aminopropyl)-amine, bis-(3-aminopropyl)-methylamine, $\beta$-hydroxyethyl-piperazine and $\beta$-aminoethyl-piperazine.

The tertiary amines can be converted into the corresponding quaternary ammonium ions either by addition of an organic or mineral acid or by reaction with a quaternisation reagent, for example with methyl chloride, methyl bromide, methyl iodide, methyl benzenesulphonate, ethyl chloride, ethyl benzenesulphonate, dimethyl sulphate and diethyl sulphate, or ethylene oxide, propylene oxide or butylene oxide, in the presence of acids.

The reaction with the quaternising reagent can also be carried out at another suitable point of the synthesis route, for example as the last step, after the coupling reaction.

Instead of the nitroanilines, it is also possible to use the corresponding phenylenediamines which are protected on one side, for example the formylaminoanilines or the aminophenyloxamic acids, in which case selective hydrolysis of the protective group must be carried out instead of reduction.

It is equally possible to convert the suitable nitroanilines or formylaminoanilines or aminophenyloxamic acids into the corresponding β-carbonylcarboxylic acid arylides, to couple these products with a diazonium compound according to the invention and to selectively reduce or hydrolyse the coupling products, these operations being carried out in the usual manner; the resulting amino group is now reacted with a cyanuric halide in the customary manner, and this product is reacted with the diamines according to the invention; finally, the bis-quaternary ammonium compound is prepared as described above.

The dyestuff possess very good solubilities in water and polar organic solvents, so that they are suitable for the preparation of stable highly concentrated solutions.

The dyestuffs according to the invention dye materials which can be dyed with cationic dyestuffs, such as, for example, polyacrylonitrile, acid-modified polyester and polyamide, wood and leather, and also cellulose-containing materials, such as, for example, cotton and regenerated cellulose fibres, and especially paper. They give yellow dyeings with good fastness properties.

The dyestuffs can be used for beater-dyeing or surface-dyeing paper. They are suitable for sized and unsized types of paper based on bleached or unbleached pulp of various origins, such as conifer or hardwood sulphite and/or sulphate pulp.

Dyeing is preferably carried out at pH values from 4 to 8, in particular at pH 5 to 7. The dyeing temperature is in general 10° to 50°, preferably about 20°.

The auxiliaries and fillers customary in the dyeing and production of paper can also be used when the dyestuffs according to the invention are employed. The dyestuffs have an excellent affinity in the dyeing of paper. They are readily decolorization by reducing and oxidizing agents, so that recycling of waste papers is possible without difficulty. The dyeings on paper are distinguished by very good fastness to water, alcohol, milk, soap, acid, alkali and alum. In many cases this fastness to bleeding can be improved when the dyeing process is carried out in the presence of a dialdehyde according to U.S. Pat. No. 4,221,562. However, the surprisingly good fastness to light of the dyeings on paper is to be emphasised. The brilliance and clarity of the colour shades may also be mentioned. Furthermore, the dyestuffs can very readily be combined with suitable dyestuffs.

The dyestuffs can also be used for dyeing cotton and regenerated cellulose fibres, without treatment with the auxiliaries hitherto customary, such as, for example, tannin pretreatment, having to be used; the addition of salt can also be dispensed with.

In this case, dyeing is preferably carried out at pH values from 4 to 8, in particular at pH 5 to 7. The dyeing temperature is in general 60° to 130° C.

EXAMPLE A 92 g of cyanuric chloride are dissolved in 750 ml of acetone and the solution is cooled to 0°. After addition of 69 g of p-nitroaniline, 130 ml of 4N sodium carbonate solution are added dropwise in the course of one hour and the mixture is subsequently stirred for a further hour. The precipitate which forms when 600 ml of icewater are added is filtered off and introduced, in small portions, into 250 g of 3-dimethylaminopropylamine, whereupon the mixture warms to about 60°. The mixture is stirred for a further hour at about 100°. After addition of 500 ml of water, catalytic hydrogenation over Raney nickel is carried out at 50°. When the reduction has ended, the catalyst is filtered off; the filtrate is brought to pH 14 by addition of sodium hydroxide solution, whereupon the product of the formula (a)

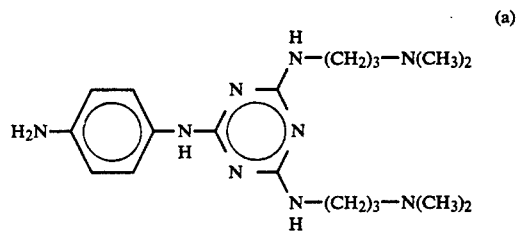

separates out as an oil.

EXAMPLE B

If an equimolar amount of 1,2-diaminopropane is used instead of the 3-dimethylaminopropylamine used in Example A, the intermediate product of the formula

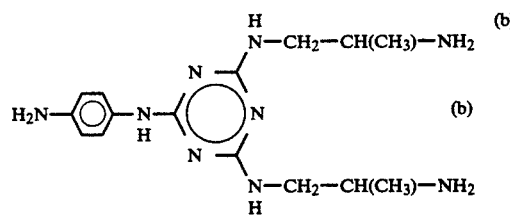

is obtained.

EXAMPLES C–L

If one of the educts listed in the following table is used instead of the 4-nitroaniline used in Example A, the corresponding products of the formula

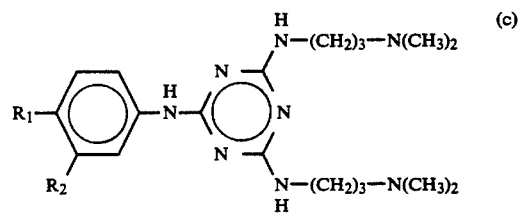

are obtained.

| Example | Educt | Product | | | |
|---|---|---|---|---|---|
| C | 3-Methoxy-4-nitroaniline | $R_1$ = | $NH_2$ | $R_2$ = | $CH_3$ |
| D | 3-Ethoxy-4-nitroaniline | | $NH_2$ | | $OC_2H_5$ |
| E | 3-Methyl-4-nitroaniline | | $NH_2$ | | $CH_3$ |
| F | 3-Chloro-4-nitroaniline | | $NH_2$ | | Cl |
| G | 3-Nitroaniline | | H | | $NH_2$ |
| H | 3-Nitro-4-methoxyaniline | | $OCH_3$ | | $NH_2$ |
| J | 3-Nitro-4-ethoxyaniline | | $OC_2H_5$ | | $NH_2$ |
| K | 3-Nitro-4-methylaniline | | $CH_3$ | | $NH_2$ |
| L | 3-Nitro-4-chloroaniline | | Cl | | $NH_2$ |

EXAMPLES M–U

If an equimolar amount of one of the educts listed in the following table is used instead of the p-nitroaniline used in Example B, the corresponding products of the formula

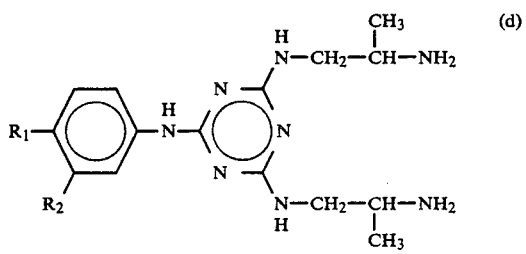

(d)

are obtained.

| Example | Educt | Product | | | |
|---|---|---|---|---|---|
| M | 3-Methoxy-4-nitroaniline | $R_1$ = | $NH_2$ | $R_2$ = | $OCH_3$ |
| N | 3-Ethoxy-4-nitroaniline | | $NH_2$ | | $OC_2H_5$ |
| O | 3-Methyl-4-nitroaniline | | $NH_2$ | | $CH_3$ |
| P | 3-Chloro-4-nitroaniline | | $NH_2$ | | Cl |
| Q | 3-Nitroaniline | | H | | $NH_2$ |
| R | 3-Nitro-methoxyaniline | | $OCH_3$ | | $NH_2$ |
| S | 3-Nitro-4-ethoxyaniline | | $OC_2H_5$ | | $NH_2$ |
| T | 3-Nitro-4-methylaniline | | $CH_3$ | | $NH_2$ |
| U | 3-Nitro-4-chloroaniline | | Cl | | $NH_2$ |

EXAMPLES V and W

If an equimolar compound of 1.2-diamino-ethane and 1-methyl-amino-3-amino-propane respectively are used instead of the 3-dimethyl-aminopropylamine used in Example A, the intermediate products of the formula

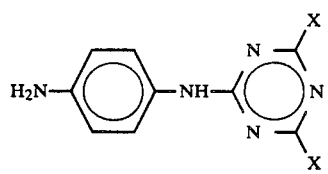

V: X = —NH—$CH_2$—$CH_2$—$NH_2$

W: X = —NH—$(CH_2)_3$—NH—$CH_3$

EXAMPLE 1

77 g of the intermediate product from Example A are dissolved in 300 ml of water, 100 g of ice and 60 ml of 30% strength hydrochloric acid are added, and diazotisation is carried out with 14 g of sodium nitrite. 41.4 g of acetoacetic acid o-anisidide are dissolved in 300 ml of water with 8 g of sodium hydroxide; this solution is added dropwise to the solution of the diazonium compound.

In order to bring the coupling to completion, the pH value is brought to about 5.5 by addition of sodium acetate and the mixture is then subsequently stirred for a further 2 hours. The pH value is brought to 9–10 by addition of sodium carbonate solution, whereupon the coupling product precipitates. This product is isolated, and dissolved in 200 ml of glacial acetic acid and 100 ml of water. The resulting stable solution dyes cellulose-containing materials greenish-tinged yellow shades.

EXAMPLES 2–10

If the intermediate products from Examples C–L are used as diazo components instead of the intermediate product from Example A used in Example 1, the yellow dyestuff of the formula (e) listed in the following table are obtained. These dyestuffs likewise give stable solutions.

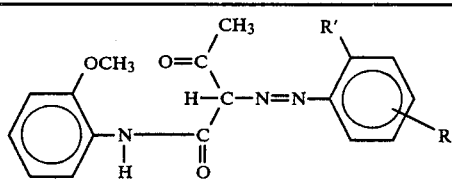

(e)

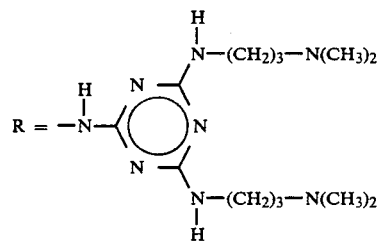

| Example | Intermediate product | R' | Dyestuff R in Position |
|---|---|---|---|
| 2 | C | $OCH_3$ | 4 |
| 3 | D | $OC_2H_5$ | 4 |
| 4 | E | $CH_3$ | 4 |
| 5 | F | Cl | 4 |
| 6 | G | H | 5 |
| 7 | H | $OCH_3$ | 5 |
| 8 | J | $OC_2H_5$ | 5 |
| 9 | K | $CH_3$ | 5 |
| 10 | L | Cl | 5 |

EXAMPLES 11–20

If acetoacetic acid anilide is used as the coupling component instead of the acetoacetic acid o-anisidide used in Example 1, and the intermediate products from Examples A and C–L are used as the diazo component, the yellow dyestuffs of the formula (f) listed in the following table are obtained. These dyestuffs likewise give stable solutions.

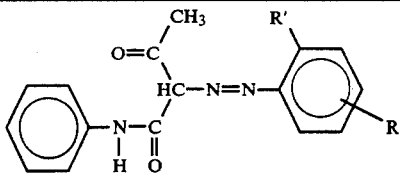

(f)

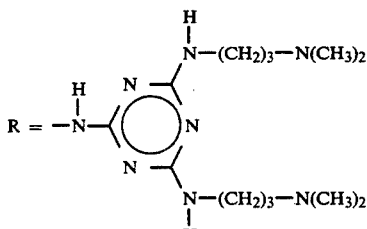

| Example | Intermediate product | R' | Dyestuff R in Position |
|---|---|---|---|
| 11 | A | H | 4 |
| 12 | C | OCH$_3$ | 4 |
| 13 | D | OC$_2$H$_5$ | 4 |
| 14 | E | CH$_3$ | 4 |
| 15 | F | Cl | 4 |
| 16 | G | H | 5 |
| 17 | H | OCH$_3$ | 5 |
| 18 | I | OC$_2$H$_5$ | 5 |
| 19 | K | CH$_3$ | 5 |
| 20 | L | Cl | 5 |

EXAMPLES 21–30

If acetoacetic acid o-toluidide is used as the coupling component instead of the acetoacetic acid o-anisidide used in Example 1, and the intermediate products from Examples A and C–L are used as the diazo component, the yellow dyestuffs of the formula (g) listed in the following table are obtained. These dyestuffs likewise give stable solutions.

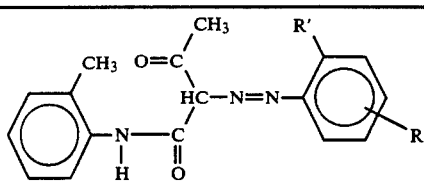

(g)

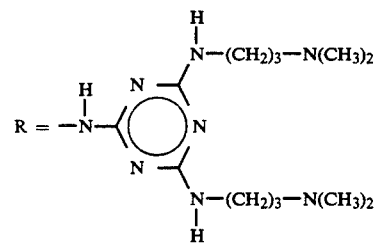

| Example | Intermediate product | R' | Dyestuff R in Position |
|---|---|---|---|
| 21 | A | H | 4 |
| 22 | C | OCH$_3$ | 4 |
| 23 | D | OC$_2$H$_5$ | 4 |
| 24 | E | CH$_3$ | 4 |
| 25 | F | Cl | 4 |
| 26 | G | H | 5 |
| 27 | H | OCH$_3$ | 5 |
| 28 | I | OC$_2$H$_5$ | 5 |
| 29 | K | CH$_3$ | 5 |
| 30 | L | Cl | 5 |

EXAMPLES 31–40

If acetoacetic acid o-chloroanilide is used as the coupling component instead of the acetoacetic acid o-anisidide used in Example 1 and the intermediate products from Examples A and C–L and B and M–U are used as the diazo component, the yellow dyestuffs of the formula (h) listed in the following table are obtained. These dyestuffs likewise give stable solutions.

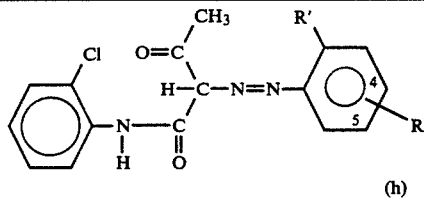

(h)

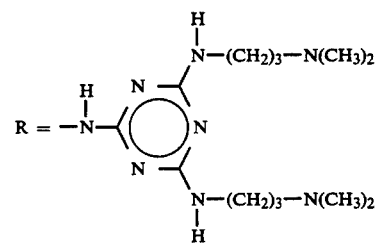

| Example | Intermediate product | R' | Dyestuff R in Position |
|---|---|---|---|
| 31 | A | H | 4 |
| 32 | C | OCH$_3$ | 4 |
| 33 | D | OC$_2$H$_5$ | 4 |
| 34 | E | CH$_3$ | 4 |
| 35 | F | Cl | 4 |
| 36 | G | H | 5 |
| 37 | H | OCH$_3$ | 5 |
| 38 | I | OC$_2$H$_5$ | 5 |
| 39 | K | CH$_3$ | 5 |
| 40 | L | Cl | 5 |

EXAMPLES 41–50

If acetoacetic acid m-xylidide is used as the coupling component instead of the acetoacetic acid o-anisidide used in Example 1 and the intermediate products from Examples A and C–L are used as the diazo component, the yellow dyestuffs of the formula (i) listed in the following table are obtained. These dyestuffs likewise give stable solutions.

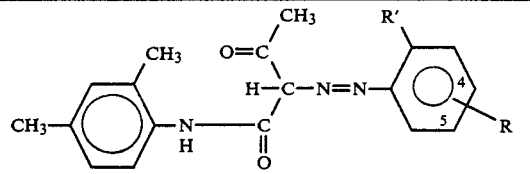

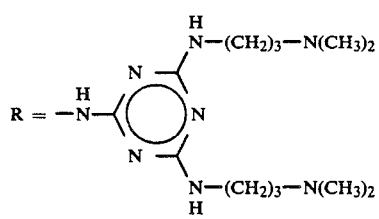

(i)

| Example | Intermediate product | R' | Dyestuff R in Position |
|---|---|---|---|
| 41 | A | H | 4 |
| 42 | C | OCH$_3$ | 4 |
| 43 | D | OC$_2$H$_5$ | 4 |
| 44 | E | CH$_3$ | 4 |
| 45 | F | Cl | 4 |
| 46 | G | H | 5 |
| 47 | H | OCH$_3$ | 5 |
| 48 | I | OC$_2$H$_5$ | 5 |
| 49 | K | CH$_3$ | 5 |
| 50 | L | Cl | 5 |

EXAMPLE 51

If an equimolar amount of the intermediate product from Example B is used instead of the intermediate product from Example A used in Example 1, a solution of the yellow dyestuff of the formula

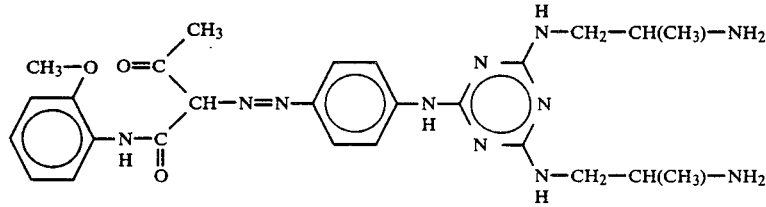

is obtained.

EXAMPLES 52–60

If the intermediate products from Examples M–U are used instead of the intermediate product from Example B used in Example 51, solutions of yellow dyestuffs of the formula (k) are likewise obtained.

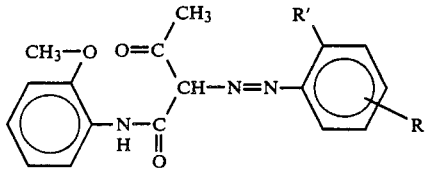

(k)

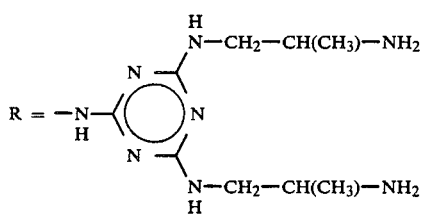

| Example | Intermediate product | R' | Dyestuff R in Position |
|---|---|---|---|
| 52 | M | OCH$_3$ | 4 |
| 53 | N | OC$_2$H$_5$ | 4 |
| 54 | O | CH$_3$ | 4 |
| 55 | P | Cl | 4 |
| 56 | Q | H | 5 |
| 57 | R | OCH$_3$ | 5 |
| 58 | S | OC$_2$H$_5$ | 5 |
| 59 | T | CH$_3$ | 5 |
| 60 | U | Cl | 5 |

EXAMPLE 61–63

If different acetoacetic acid anilide derivatives are used as coupling components, and the intermediate products from Examples V and W are used as diazo components, the yellow dyestuffs of the formula (1) listed in the following table are obtained. These dyestuffs likewise give stable solutions.

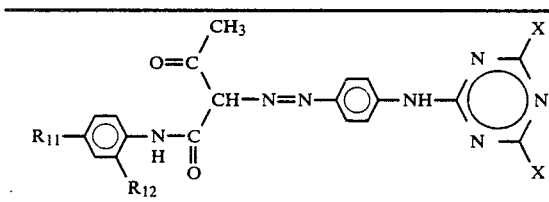

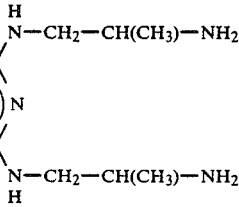

| Example | R$_{11}$ | R$_{12}$ | X |
|---|---|---|---|
| 61 | H | Cl | —NH—CH$_2$—CH$_2$—NH$_2$ |
| 62 | OCH$_3$ | H | |
| 63 | H | OCH$_3$ | —NH—(CH$_2$)$_3$—NH—CH$_3$ |

EXAMPLE 64

A paste of the coupling products from Example 1 is suspended in 400 ml of water and the pH value of this suspension is brought to about 10 with dilute sodium hydroxide solution. 37.8 g of dimethyl sulphate are slowly added dropwise at room temperature, the pH value being kept constant by addition of dilute sodium hydroxide solution. When the quaternisation has ended, the mixture is heated to 80° in order to destroy excess dimethyl sulphate. A stable solution which dyes cellulose-containing materials in greenish-tinged yellow shades is obtained.

EXAMPLES 65–126

If pastes of the coupling products from Examples 2–63 are used instead of the coupling product paste used in Example 64, solutions of yellow dyestuffs are likewise obtained.

EXAMPLE 127

A dry substance consisting of 60% of mechanical wood pulp and 40% of unbleached sulphite pulp is beaten with water in a hollander to a SR freeness of 40°, so that the solids content is somewhat above 2.5%, and the high-density substance is then adjusted to a solids content of 2.5% with water.

5 parts of a 0.5% strength aqueous solution, containing acetic acid, of the dyestuff from Example 1 are added to 200 parts of this high-density substance, the mixture is stirred for about 5 minutes, 2% of rosin size and 3% (based on the dry substance) of alum are added and the mixture is again stirred for some minutes, until it is homogeneous. The pulp is now diluted with about 500 parts of water and sheets of paper are produced in the customary manner by filtration of the pulp over a sheeter. The sheets of paper are dyed greenish-tinged yellow. The effluent from the dyeing is virtually free from dyestuff.

EXAMPLE 128

If the dyestuff from Example 64 is used instead of the dyestuff used in Example 127, greenish-tinged yellow-coloured sheets of paper and an effluent which is virtually free from dyestuff are likewise obtained.

EXAMPLES 129+130

Greenish-tinged yellow dyeings on paper and effluents which are virtually free from dyestuff are also obtained in the dyeing of unbleached paper pulp under otherwise identical dyeing conditions and when bleached sulphite pulp is used.

I claim:

1. A dyestuff of the formula

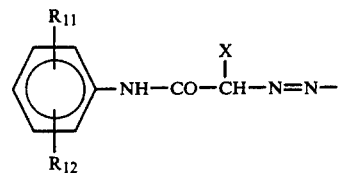

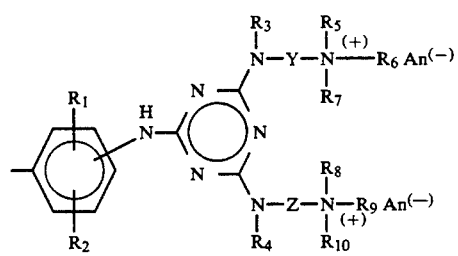

wherein
$R_{11}$ and $R_{12}$ independently of one another are H, Cl, Br, $OCH_3$, $OC_2H_5$, $CH_3$ or $C_2H_5$,
X is a radical of the formula $COCH_3$, CN, $COOCH_3$, $COOC_2H_5$, $CONH_2$ or $COC_6H_5$,
Y and Z independently of one another are $C_2$–$C_5$-alkylene,
$R_1$ and $R_2$ independently of one another are H, Cl, Br, $OCH_3$, $OC_2H_5$, $CH_3$ or $C_2H_5$,
$R_3$ and $R_4$ indenpendently of one another are hydrogen or $C_1$–$C_4$-alkyl,
$R_5$–$R_{10}$ independently of one another are hydrogen, $C_1$–$C_4$-alkyl, $\beta$- or $\gamma$-hydroxy-$C_2$–$C_4$-alkyl, phenyl or benzyl, or
$R_5$ and $R_6$, and/or $R_8$ and $R_9$ in each case together with the nitrogen, form a pyrrolidine, morpholine or piperidine ring, or
$R_5$, $R_6$ and $R_7$ and/or $R_8$, $R_9$ and $R_{10}$, in each case together with the nitrogen, form a pyridinium or picolinium radical, and
$An^{(-)}$ is an anion.

2. A dyestuff according to claim 1 of the formula

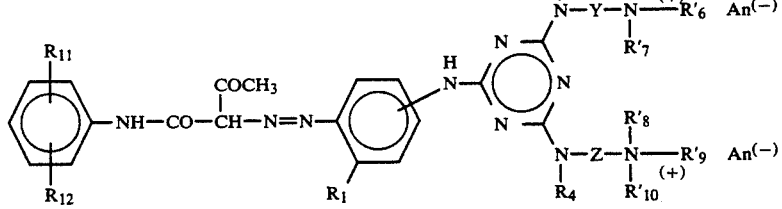

wherein
$R_1$, $R_3$, $R_4$, $R_{11}$, $R_{12}$, Y, Z and $An^{(-)}$ have the meaning of claim 1, and
$R'_5$–$R'_{10}$ independently of one another are hydrogen or $C_1$–$C_4$-alkyl.

3. A dyestuff according to claim 1 of the formula

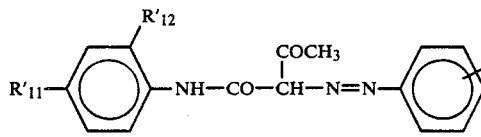 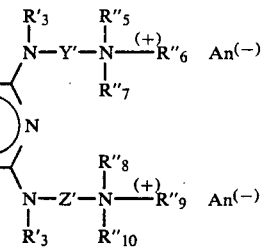

wherein
R'$_{11}$ and R'$_{12}$ independently of one another are H, Cl, OCH$_3$, CH$_3$,
Y' and Z' independently of one another are C$_2$- or C$_3$-alkylene,
R'$_3$ and R'$_4$ independently of one another are H or CH$_3$,
R''$_5$–R''$_{10}$ independently of one another are H, CH$_3$ or C$_2$H$_5$.

4. A dyestuff of claim 3, wherein R''$_5$–R''$_{10}$ are H, or R''$_5$ and R''$_8$ are CH$_3$ or C$_2$H$_5$ and R''$_6$, R''$_7$, R''$_9$ and R''$_{10}$ are hydrogen.

* * * * *